April 10, 1962    A. LAURI    3,028,676
ECCENTRICITY AND THICKNESS GAUGE
Filed Jan. 6, 1958    2 Sheets-Sheet 1
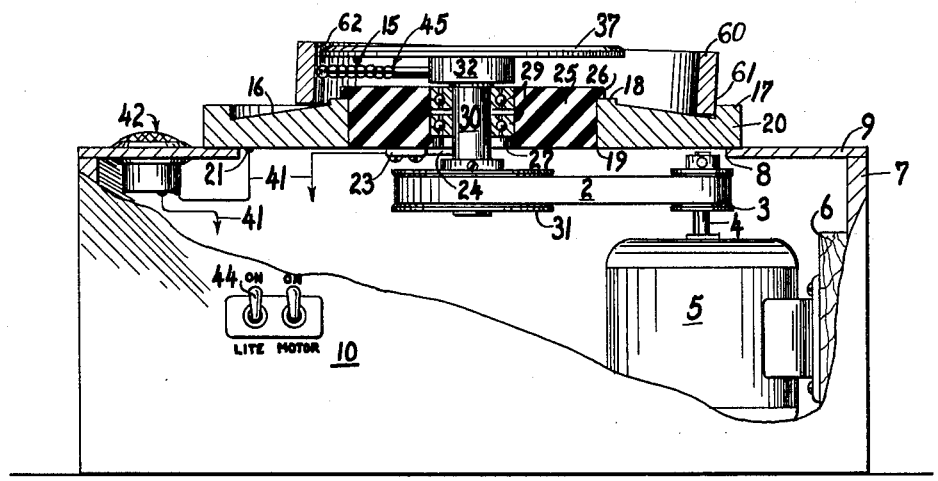
INVENTOR.
ANGELO LAURI
BY John P. Murphy
ATTORNEY April 10, 1962 A. LAURI 3,028,676
ECCENTRICITY AND THICKNESS GAUGE
Filed Jan. 6, 1958 2 Sheets-Sheet 2

INVENTOR.
ANGELO LAURI
BY
John P. Murphy
ATTORNEY

United States Patent Office 3,028,676
Patented Apr. 10, 1962

3,028,676
ECCENTRICITY AND THICKNESS GAUGE
Angelo Lauri, 725 W. Court St., Rome, N.Y.
Filed Jan. 6, 1958, Ser. No. 707,235
13 Claims. (Cl. 33—178)

This invention relates to a method of and apparatus for measuring and more particularly to a method and instrument for measuring eccentricity and thickness of wall and variations thereof, of generally cylindrical objects.

Heretofore, methods and apparatus have been provided for testing cylindrical objects which are either cumbersome or slow. The methods at times provided for the testing of an object at various points, without completely testing the object at all points therearound. Such a method provides for the use of a micrometer or the like for the testing of wall thickness at several points around the object, or at given increments. It is obvious that such a method is slow, does not test the object at all points, and is subject to human error. Further, if the object being tested is out of tolerance at one small point thereon, said point is likely to be missed in such a testing method. Another testing apparatus comprises a cylinder for holding the cylindrical object to be tested. The inside diameter of the cylinder is the same as that of the cylinder in which the object is to be used. It is therefore obvious that such an apparatus is limited to the testing of an object of only one size with the requirement for providing a separate cylinder for each size object to be tested. It follows that an object to be tested must be carefully placed in said cylinder in order to be accurately tested, such a method being time consuming. All of the above methods have a major shortcoming in that only a limited number of objects may be inspected in a given time.

It is, accordingly, a leading object of the present invention to provide a method and apparatus for the measuring of an infinite number of points, thus all points, around the circumference of a cylindrical object in order to determine variations of wall thickness in regard to tolerance. It is also the object of this invention to provide for a method and apparatus for measuring an infinite number of points of a cylindrical object within a given range with regards to eccentricity.

It is a further object of this invention to provide for inspection of cylindrical objects, whereby a great number of objects may be inspected in a given period of time.

In accordance with the above objects, an apparatus is provided for inspection of cylindrical objects such as rifling bands for projectiles, piston rings, bearing carriers, bearing inserts, bushings, machined hubs, axle housings, and other machine bands and rings for machine tooling and the like. These objects are inspected for eccentricity where the requirement of the object is absolute roundness; and are inspected for wall thickness which is required to fall within a tolerance given in the specifications therefor. The invention also provides for a method of such inspection including the rotating of an electrical contact around the inside of a cylindrical object, which object is being itself rotated around the inner periphery of a carrier therefor. The contact being adjusted with respect to its radius so that it will not contact an object of diameter and wall thickness falling within tolerance, will contact the object if the object is outside of tolerance, thereby closing an electrical circuit to a means for indicating such an object.

The carrying out of the above objects may be understood best by the following specification, when taken with reference to the accompanying drawings, in which:

FIGURE 1 is a side elevation of the invention, partly in cross section.

FIGURE 2 is a side elevation of one component part of the invention.

FIGURE 3 is a cros-sectional elevation of one component of the invention, taken on line 3—3 in FIGURE 4.

FIGURE 4 is a top plan view of the component shown in FIGURE 3.

FIGURE 5 is a top plan view of the electrical contact.

Figure 6:
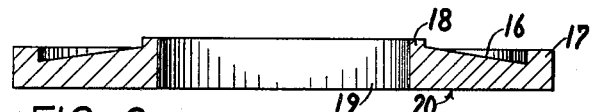
FIGURE 6 is a cross-sectional elevation of the object carrier.

It is to be understood that in the drawings and description, an embodiment is disclosed for the purpose of illustration only, and that adaptations may be made to conform to inspection requirements of any cylindrical object adapted to be inspected by this apparatus and method.

Figure 9:
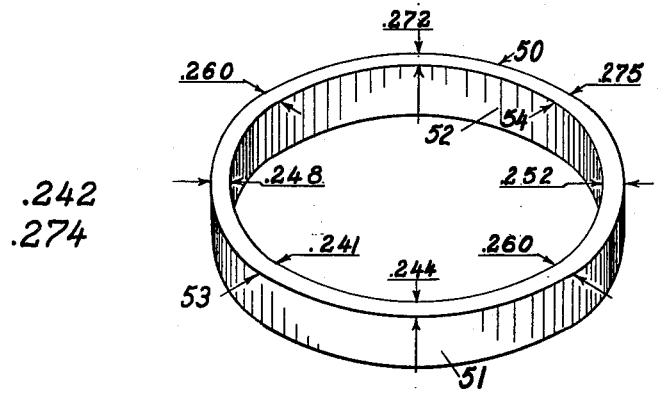
FIGURE 9 illustrates a representative object for testing on this gauge.

A band 50, such as a rifing band for a projectile, is shown in FIGURE 9, having an inner surface 52 and an outer surface 51, and which may most conveniently be formed from drawn or extruded tubing. An inherent fault of extruded tubing is a condition of eccentricity due to the drawing plug being off-center when the tubing is formed. The wall thickness between surfaces 51 and 52 is to be tested, which wil lindicate any condition of ecentricity. The bands are made in accordance to specifications and must be tested for acceptance or rejection, and must conform to the specifications laid down in all particulars within the tolerance limits of such specifications.

Two representative points, 53 and 54 are indicated on the band in FIGURE 9. The mean wall thickness (for purposes of illustration only) is specified as being .258 inch. The minimum wall thickness allowable is .242 inch, and the maximum wall thickness allowable is .274 inch. Reference point 53 indicates a wall thickness of .241 inch, thus being under tolerance at that point; while point 54 indicates .275 inch, thus being over tolerance at that point. On a gauge adapted to indicate eccentricity, an out-of-round condition will be indicated.

FIGURE 1 illustrates an assembly of an apparatus for indication of the above condition. A casing 10 is provided having sides 7 supporting a top 9 which top has an opening 8 therethrough. An electrical motor 5 is mounted conventionally to any suitable mounting block 6, which may be fastened to a side 7, or mounted on the bottom (not shown) of the casing 10. A V-belt pulley 3 is mounted conventionally on shaft 4 of the motor 5, and is adapted to operate a conventional V-belt, 2.

A carrier plate 20 is disposed over the opening 8 in top 9 of the casing 10, and may be adjustably fastened to the top 9 by any conventional means such as bolts or screws (not shown). This plate, as shown in cross section in FIGURE 6, is of any metallic, current conducting material, preferably steel. The outer periphery of plate 20 forms an outer annular flange or ring 17, the inner edge of which is at all points an equal radius from the center of the plate. There is a round, central opening 19, the sides of which are also at all points on an equal radius with the center of the plate. The upper edge of the central opening 19 forms an inner annular flange 18, the upper surface of which is elevated above the upper surface of the outer annular flange 17. A beveled, sloping surface 16 is disposed between the flanges 17 and 18. It is to be understood that, this being a precision gauge, all surfaces are machined true, and in the case of circular objects, forming components of the gauge, all points are on an equal radius with the center of such components. The plate 20 is formed preferably of steel, as steel is a conductor of electricity, and is subject to relatively great amounts of usage without appreciable wear.

Disposed within the central opening 19 of plate 20 is an insulating bushing 25, FIGURE 2. This bushing has an annular flange 26 around its upper edge. The bushing also has a central opening, as indicated by the dotted lines 27. The lower portion of the round central opening 27 is of reduced diameter, the purpose for which will be described.

The bushing 25 may be made from mica, Bakelite, or any other material having a relatively fair degree of structural usefulness, and not being adapted to carry electrical current. The bushing, at its main body portion, is made to conform exactly to the inside diameter of the opening 19 in plate 20 in order that an exact fit may be had when the bushing is press-fitted into the opening 19. The flange 26 is thereby disposed over the top of the inner flange 18 to prevent the bushing from sliding downwardly through the opening 19 in the plate 20. A pair of conventional ball-bearings 29 are disposed in the central opening 27 of the bushing 25. The diameter of the outer race of the bearings is exactly the same as the diameter of the opening 27. The reduced diameter portion of the opening 27 serves to prevent the bearings from slipping downwardly out of position. Any suitable spacer (not shown) is disposed between the two bearings in order to maintain the bearings 29 in their intended position.

A spindle 30, according to FIGURES 1 and 3, is maintained in position by the inner races of the bearings 29. The shaft of the spindle 30 is exactly the same diameter as that of the inner races of the bearings 29. A small portion of the upper end of the shaft of spindle 30 is enlarged in diameter, so as to rest on the side of the inner race of the upper bearing 29, thus preventing the shaft from being displaced from its intended position. At the lower end of the shaft is a V-belt pulley 31, fastened to the shaft by any conventional means such as a set screw, and having a V-belt of conventional type connecting it to the pulley 3.

The upper end of the spindle 30 is enlarged in shape to form a head 32, having a transverse hole 33 through a diameter thereof. One end of this hole is threaded to receive an adjusting screw 34, in the manner of a set screw. A locking screw or set screw 35 is disposed in a vertical hole through the center of the top end of the head 32 of spindle 30. Two threaded holes 36 are also provided in the top of the head 32 (FIGURE 4), the purpose for which will be described.

FIGURE 5 illustrates an embodiment of a contact arm as presently used in conjunction with the gauge. A cylindrical portion 46 has fastened at one end thereof, a lop of relatively stiff wire 47, such as piano-type wire, or the like. The ends of the loop 47 are soldered or otherwise fastened to the end of the portion 46. The portion 46 is preferably formed from tubing, in the interest of providing better balance of the rotating spindle 30 and contact arm 45. It is well known that tubing is lighter in weight than solid rod. A coiled contact spring 48 is disposed with its individual coils around the loop of wire 47, so that the loop of wire 47 runs through the coil 48. The ends of the coil 48 are soldered or otherwise fastened with an electrical connection to the end of the tube 46. It will be noted that some degree of slight tension on the coil 48 is desirable in the interest of maintaining a degree of rigidity to the contact. The back end 49 of the contact arm 45 is inserted into the transverse hole 33 in the head 32 of spindle 30, and the lock screw 35 is tightened against the tube 46 to maintain the contact arm 45 in position.

Figure 7:
FIGURE 7 is a cross-sectional elevation of the protective cover.

FIGURE 7 illustrates a protective cover plate 37, round in shape, and having a central hole 38. Two screw holes 39 are provided to receive screws (not shown) which fasten the plate 37 to the head 32 of spindle 30 by means of threaded holes 36, as mentioned above. A threaded hole 40 at one side of the plate 37 is adapted to receive a second adjusting screw 15 (FIGURE 1). This second screw 15 is adapted to move the loop of wire 47 and coil 48 farther away from the plate 37, or allow the loop and coil to spring closer to the plate 37, as will be described. The plate 37 is fastened to the top of the head 32, and the contact arm extends slightly beyond the edge of the plate 37.

Figure 8:
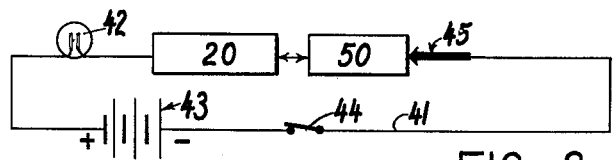
FIGURE 8 is a schematic of the electrical circuit.

A conventional electrical contact brush 24 is disposed in contact with spindle 30 at the bottom of the insulating bushing 25 by means of a brush holder 23, and held thereat by any suitable means such as screws. A neon indicator 42 is disposed at any convenient location to the view, such as at the top 9 of the casing 10. Wires 41 are fastened to the neon indicator 42, brush 24, and at any point 21 on the carrier plate 20. As shown in FIGURE 8, the wires 41 are connected in series with an on-off switch 44, of conventional type, a battery 43 or other source of current, the neon indicator 42, carrier plate 20, and the object to be tested 50, by means of the contact arm 45. The circuit may be energized by the on-off switch 44. This switch 44, along with any suitable switch for actuation of the electrical motor through an independent current source, is mounted at any convenient location on the casing 10. The neon indicator 42 has been determined as being particularly well adapted to this combination of elements. A suitable combination could include a type NE-51 bulb along with a 90 volt battery.

The setup and adjustment of the apparatus is as follows:

The components of the apparatus are assembled as described above. A band 60, known to be as nearly perfect as possible in all dimensions, herein called the standard, is placed on the carrier plate 20, as shown in FIGURE 1. The standard is placed so that one point of the outer surface 61 thereof is against the inner edge of the outer annular flange 17, as indicated at the right side of the illustration in FIGURE 1. The bottom edge of the standard will then rest against the beveled surface 16 of the plate 20. Prior to adjusting the length of the contact arm to the precise gap required, the contact arm is adjusted to intersect the longitudinal center line of the standard. Assuming that the standard is one inch in length, the center line of the contact arm would intersect the inner edge or surface of the standard one-half inch from the lower or upper edge thereof. This adjustment is made by tightening or loosening the adjusting screw 15 as it bears against the upper side of the contact arm 45, thus bending the arm 45 downwardly slightly, or allowing it to spring upwardly, until it points at the midpoint of the standard longitudinally.

With the cover plate 37 removed, the lock screw 35 is loosened in the head 32 of the spindle 30. It is of course understood that the motor 5 is not operating at this time, and that the contact arm 45 is stationary. Adjusting screw 34 is adjusted, and the tube 46 of contact arm 45 is moved, so that a very small gap remains between the coil 48 and the inner surface 62 of the standard at a point opposite the point where the standard engages the flange 17 on plate 20. This gap is determined by the tolerances given in the specifications for the band, and is adjusted in the conventional manner by the use of a feeler or thickness gauge commonly in use by engineers and mechanics. With the gap set as required, the adjusting screw 34 if not already in contact, is set against the back end 49 of tube 46, and the locking screw 35 is then tightened down to the tube 46, retaining the contact arm in its adjusted position. The cover is then replaced over the head 32 by means of screws through holes 39 and into holes 36. The cover serves to protect the contact arm from being struck and thus maladjusted, and also protects the operator from possible injury during use of the apparatus. It is understood that the standard is checked at several points as to the gap setting between the contact arm and the standard before the cover is replaced. This is done by revolving the standard in place manually, so as to inscribe a circle within the flange 17, and rocking the standard slightly while using the thickness gauge to determine if the gap setting is correct. With the correct gap setting it will be seen that contact arm 45 and spring 48 when rotated form or define a partial cylindrical surface whose radius is a predetermined function of the difference between the radius of flange 17 and the diameter and thickness of the band 60. The flange 17, which may be said to define an outer partial cylindrical surface, obviously must have a diameter greater than band 60 but less than twice the diameter of band 60.

With all adjustments made to the apparatus, the standard is removed, and the apparatus is used in the inspection of bands as follows:

The operator grasps a band 50 to be checked in his hands, and places it in over the cover 37 and down onto plate 20 in the same manner as the standard, and as shown in FIGURE 1. The outer surface 51 of the band 50 is placed to engage the inner edge of flange 17 on the plate 20 at any point thereon. The switch 44 is turned on, energizing the testing circuit having the neon indicator.

The motor 5 is turned on, turning pulley 3, which turns belt 2 to turn pulley 31 on the spindle 30. Thus, the contact arm 45, cover plate 37 and spindle 30 will spin as a unit.

The operator, holding the band 50 at the outside thereof between the fingers of both hands, moves the band around the plate 20, keeping the band against the flange 17, so as to inscribe at least one complete turn or circle without permitting the band to change position in his hands. It will become obvious that, during this operation, an infinite number of points on the band 50 will at successive instants be in contact with the flange 17 of plate 20. Due to the rotation of the contact arm 45 at a relatively high speed, the contact arm will also be in alignment with all or nearly all points on the band 50 at least one time.

It will be understood that, at this point, current does not flow continuously in the circuit to light the indicator 42. However, in the case of a band 50 having a wall thickness which is outside of tolerance, the circuit will be closed, and indicator 42 will light.

With reference to FIGURE 9, a typical band is illustrated having a wall thickness which must fall between .242 inch and .274 inch, as described hereinabove. Point 53 on this band is illustrated as being .241 inch, or outside of tolerance. During the testing of this band, when point 53, or point 54 (also out of tolerance) is against the flange 17, and when the contact arm passes the point opposite points 54 or 53, the contact arm will touch the band 50. This will close the circuit as in FIGURE 8, and cause the indicator 42 to light. Thus, a bad band is indicated. A band having all points within tolerance will not be touched by the contact arm, and will therefore not be indicated as being a bad band. It will also be seen that any band which is eccentric or oval or has a "flat" on the periphery will be indicated as being a bad band.

It will therefore be seen that a cylindrical object may be tested for a condition of wall thickness and eccentiricity outside of specification tolerance by moving the object with its outer surface in contact with the inner edge of an annular ring so as to inscribe at at least one complete circle therein. At the same time, a contact arm adjusted with respect to its radius, is rotated inside the surface of the object, and from the center of the plate, so as to make contact with the object, and complete the indicator circuit when a condition outside of tolerance exists. The indicater means is connected through the contact arm, and through the plate, an indicator light, and through the object to be tested. Thus, when the bad band condition exists, or when the contact arm makes contact with the band, the circuit will be completed, and the light will light.

It is to be understood that the description and specifications given herein are merely illustrative of a specific embodiment, and that changes may be made from time to time as may fairly fall within the true spirit and scope of the appended claims.

I claim:

1. An apparatus for measuring and inspection of cylindrical objects for eccentricity and wall thickness comprising in combination a casing member, a round plate positioned on said casing having a central opening therein and an annular ring thereon, an insulating annular bushing fitted in said central opening in said plate, a spindle mounted in bearings in said bushing, a contact arm adjustable fixed on said spindle and extending outwardly therefrom, means for varying the relative position of said contact and spindle to adjust the radius of said contact arm to a specified amount less than the radius of said annular ring, motor means for rotating said spindle operatively connected thereto, a source of power, and indicator means for indicating the condition of wall thickness outside of specification tolerance and eccentricity connected in series with said plate and said spindle whereby when the object to be tested is moved around said annular ring on said plate in contact therewith and said contact arm is rotated, the circuit through said indicator means will be completed when said object is out of tolerance and contacts said arm.

2. An apparatus according to claim 1, further characterized by said plate having a beveled surface sloping upwardly from the inside of said ring toward the central opening in said plate, whereby said object to be tested is placed on said beveled surface having the outside surface of said object against the inside edge of said flange on said plate.

3. Apparatus according to claim 1, further characterized by said spindle having the upper end thereof enlarged forming a head, said head having a transverse hole therethrough, one end of said hole being threaded for receiving an adjusting screw therein, said head having a vertical hole therein for receiving a lock screw, whereby said contact arm is received adjustably in said transverse hole and is adapted to be locked in place therein.

4. Apparatus according to claim 1, wherein said contact arm comprises an elongated cylindrical portion, a loop of wire being fastened to one end of said portion and a coiled spring disposed around said loop, said coiled spring being fastened at its ends to said cylindrical portion, said cylindrical portion being adapted to be inserted at the other end thereof into said spindle and locked into position thereat.

5. An apparatus for measuring annular objects for eccentricity and wall thickness comprising in combination a casing member, a circular plate member adjustably mounted on said casing member adjacent the top thereof, a contact arm mounted for rotary motion relative to said plate, motor means for rotating said contact arm mounted within said casing, an annular ring portion operatively associated with said plate member, said contact arm being mounted at the center of said annular ring portion, indicating means connected in series with said contact arm, said ring portion and an object to be tested on said plate whereby when the outer surface of said object to be tested is moved around in contact with said annular ring portion and said contact arm is rotated around the inner surface of said object an actuating circuit for said indicating means will be completed only when said object is outside of specification tolerance.

6. An apparatus for measuring annular objects for eccentricity and wall thickness comprising in combination a casing member, an annular plate member adjustably mounted on said casing member adjacent the top thereof, a spindle member rotatably mounted in said plate member, a contact arm adjustably carried by said spindle, an annular ring portion operatively associated with said plate member and concentrically positioned about said spindle member, means for adjusting said contact arm relative to said annular ring portion to position it at the desired spacing therefrom, motor means for rotating said spindle and contact arm mounted within said casing, indicator means selectively connected in series with said contact arm, said ring portion, and an object to be tested placed on said plate member whereby when said object to be tested is moved around in contact with said annular ring portion and said contact arm is rotated around the inner surface of said object said indicator means are actuated only when said object is outside of specification tolerance.

7. A thickness and eccentricity gauge for a circular cylindrical object comprising an annular ring member defining a first partial cylindrical surface having an internal diameter greater than the maximum allowable outer diameter of the object and less than twice the outer diameter of the object, means defining a second circular partial cylindrical surface concentrically located within and parallel to the surface of the annular ring member, the defined second surface having a radius which is a predetermined function of the difference between the internal radius of the annular ring member and the diameter and thickness of the object and means for producing an indication whenever the object is simultaneously in contact with the inner surface of the annular ring member and the second surface defining means.

8. A gauge for detecting eccentricity and thickness deviations of a circular cylindrical ring comprising a plate, an annular ring portion operatively associated with said plate, the annular ring portion having an internal diameter greater than the maximum allowable diameter of the ring to be tested and less than twice the diameter of the ring to be tested, means defining a surface of circular contour concentric with the inner surface of the annular ring portion, said surface having a diameter which is a predetermined function of the internal diameter of the annular ring portion and the diameter and thickness of the ring to be tested and means for providing an indication when the ring to be tested being held in contact with the annular ring portion is also in contact with said surface.

9. The gauge of claim 8 in which the means defining the surface of circular contour is adjustable to increase or decrease the diameter of the surface defined.

10. The gauge of claim 9 wherein the means defining the surface of circular contour are electrically insulated from the plate, the indicating means comprises an electrical circuit connected between the defining means and the plate, the circuit including an electrical indicator and source of electrical energy for actuating the indicator.

11. A method for testing cylindrical objects for eccentricity and for a condition of wall thickness outside of specification tolerance comprising defining a first outer annular partial surface, defining a second annular partial surface concentric with and inside said first surface, moving the cylindrical object to be tested around the inside of said first surface in contact therewith, choosing the diameter of said defined second surface such that said object to be tested will intersect said defined second surface if out of tolerance and providing indicating means to indicate such intersection.

12. A method for measuring annular objects for eccentricity and wall thickness comprising defining first and second annular and concentric surfaces, said second surface having a radius which is a predetermined function of the difference between the internal radius of said first surface and the radius and thickness of the annular object, moving said annular object about and in contact with the inside of said first surface and providing indicating means for indicating the intersection of said annular object and said second surface.

13. A method for testing cylindrical objects for eccentricity and for a condition of wall thickness outside of specification tolerance comprising defining a first outer annular partial surface, defining a second annular partial surface concentric with and inside said first surface, moving the cylindrical object to be tested around and in contact with one of said defined surfaces, choosing the diameter of the other of said surfaces such that said object to be tested will intersect said other surface and indicating the degree of contact and intersection of said surfaces.

References Cited in the file of this patent
UNITED STATES PATENTS

| 1,898,133 | Leibe | Feb. 21, 1933 |
| 2,621,416 | Brenneke | Dec. 16, 1952 |
| 2,692,439 | Wilson | Oct. 26, 1954 |